Figure 3:
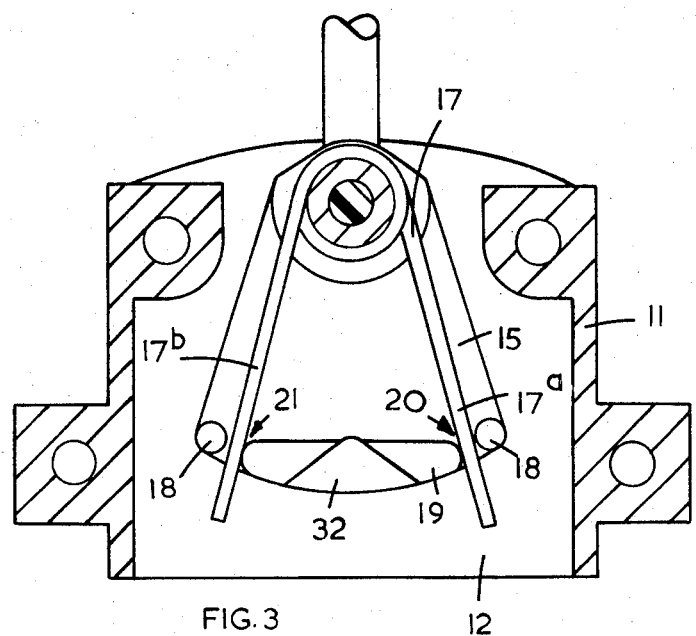

United States Patent [19]

Tomlinson

[11] 3,794,785
[45] Feb. 26, 1974

[54] SWITCH ACTUATING MECHANISM FOR TURN INDICATOR TYPE SWITCHES

[75] Inventor: Neil Tomlinson, Burnley, England

[73] Assignee: Joseph Lucas (Industries) Limited, Birmingham, England

[22] Filed: June 5, 1972

[21] Appl. No.: 259,950

[30] Foreign Application Priority Data
Aug. 6, 1971   Great Britain.................. 37,033/71

[52] U.S. Cl............ 200/61.27, 200/61.3, 200/61.35
[51] Int. Cl. ............................................. H01h 3/16
[58] Field of Search ...................... 200/61.27–61.35, 200/61.54

[56] References Cited
UNITED STATES PATENTS
3,542,981   11/1970   Wilkinson........................... 200/61.3

3,665,130   5/1972   Suzuki ............................. 200/61.27
2,643,308   6/1953   Lincoln et al................ 200/61.35 X
2,678,358   5/1954   Thomson........................ 200/61.35

Primary Examiner—J. R. Scott
Attorney, Agent, or Firm—Holman & Stern

[57] ABSTRACT

A switch actuating mechanism for a self-cancelling direction indicator switch, in which mechanism a switch control lever is biased by a torsion spring from its two indicating positions to a central non-indicating position. Arms of the torsion spring slide along ramp surface and into detents to retain the control lever in a selected operating position. A release member having a portion which is engageable by a striker on a vehicle steering column is pivotable thereby and cam surfaces on the release member can engage and release respective arms from the detents so that the torsion spring can urge the lever into its central position.

3 Claims, 6 Drawing Figures

FIG.1

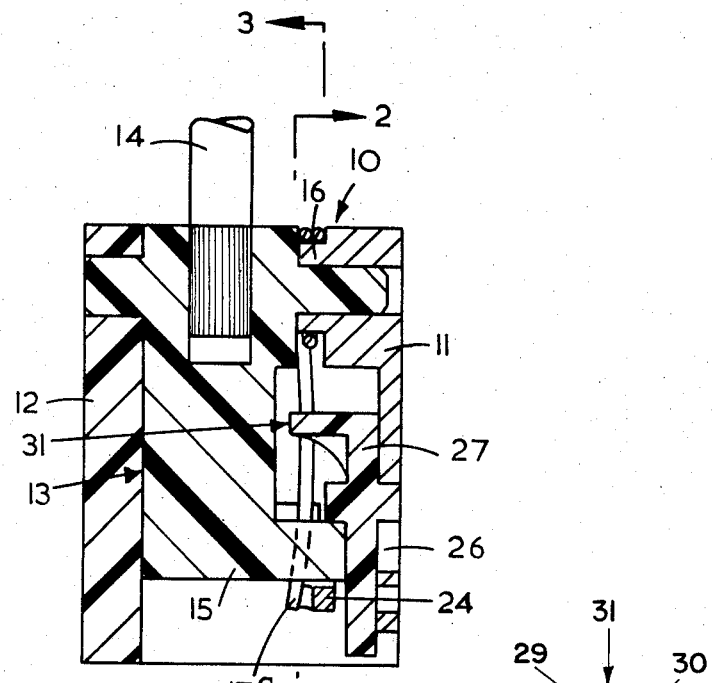
FIG.1
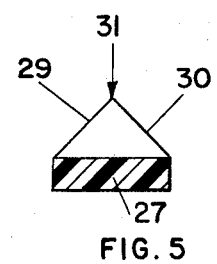
FIG. 5
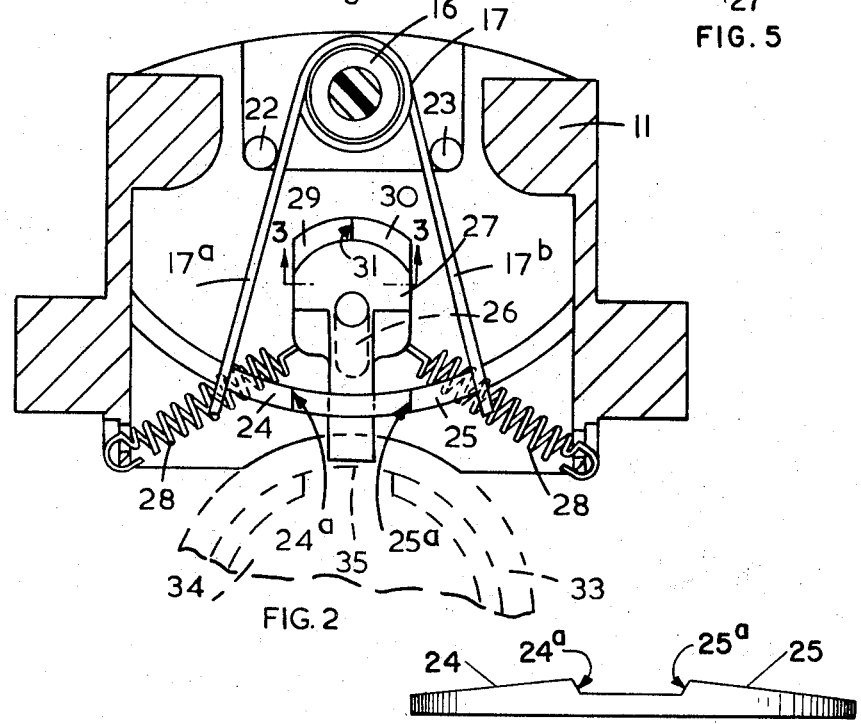
FIG. 2
FIG. 4

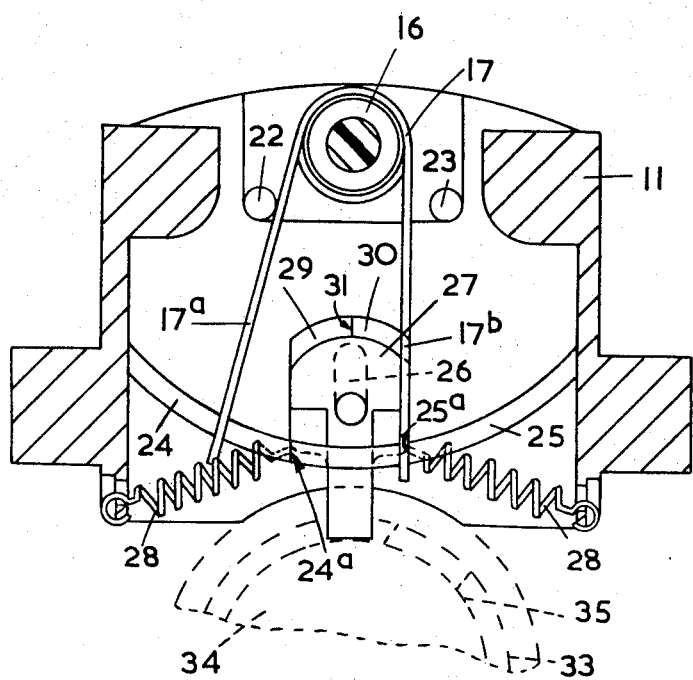
FIG. 2ᵃ

SWITCH ACTUATING MECHANISM FOR TURN INDICATOR TYPE SWITCHES

This invention relates to actuating mechanisms for self-cancelling direction indicator switches for road vehicles.

According to the invention a switch actuating mechanism for a self-cancelling direction indicator switch comprises a body, a lever pivotally mounted on the body and movable in opposite directions from a central position to a pair of operative positions, a pair of spring arms on the body engaged with the lever for deflection thereby upon movement of the lever away from its central position so as to bias the lever towards its central position, each of the arms also being capable of deflection in a direction transverse to the directions of movement of the lever, a pair of detent portions on the body, into engagement with which portions the respective arms can move in the transverse direction when the lever is moved to its respective operating positions, a release member mounted on the body for pivotal movement and for movement towards and away from a striker-engaging position, the release member having thereon a cam surface engageable with either one of said arms. When the respective arm is engaged with its associated detent portion, for transversely moving that arm to release it from engagement with the associated detent portion when the release member is pivotally displaced by an associated striker, spring means acts on the release member to urge it to the striker-engaging position and an abutment on the lever for displacing the release member out of its striker-engaging position when the lever is in its central position.

An example of the invention will now be described with reference to the accompanying drawings, in which:

FIG. 1 is a section through a switch actuating mechanism,

FIG. 2 is a section on line 2—2 in FIG. 1 showing the mechanism in a neutral position, FIG. 2a is a view similar to FIG. 2, but showing the mechanism in an operative position, FIG. 3 is a section on line 3—3 in FIG. 1, FIG. 4 is a section on line 4—4 in FIG. 2, and FIG. 5 is an elevation of a pair of ramps forming part of the mechanism shown in FIG. 2.

The mechanism has a body 10, comprising a base 11 and a cover 12. Pivotally mounted between the base 11 and cover 12 is a lever 13 which includes an arm 14 extending externally of the body 10 and a portion 15 lying within the body 10. The base 11 has a boss 16 surrounding a pivot of lever 13. Boss 16 locates the coil of a torsion spring 17 whose two arms 17a, 17b extend from the boss 16 within the body 10. The coil of spring 17 is a close fit on the boss 16 and is retained by engagement with lever 13. The spring 17 is thus fixedly located within the body 10.

The lever portion 15 has, at its end remote from the pivot, a pair of projections 18 and a further projection 19 between projections 18. Projections 19 and 18 define a pair of slots 20 and 21 respectively within which the spring arms 17a, 17b are respectively slidable in directions parallel to the pivotal axis of lever 13. The base 11 has a pair of projections 22, 23 towards which the respective arms 17a, 17b are biased and which are both engaged by the respective arms 17a, 17b when the lever 13 is in a central position relative to the body 10, to which central position lever 13 is urged by the spring 17.

Projecting from the base 10 are a pair of ramps 24 and 25 along which the arms 17a and 17b slide, respectively, during pivotal movement of the lever 13. The ramps 24 and 25 are provided with edges 24a and 25a, respectively, extending transversely with respect to the direction of sliding movement of the arms 17a and 17b, respectively (see FIG. 4 in particular). The edges 24a and 25a define a pair of detent portions between the ramps 24 and 25. The ramps 24 and 25 increase in height towards the respective edges 24a and 25a so that the arms 17a and 17b are deformed away from the base 11 as the lever 13 is removed to its respective operating positions. Each arm 17a or 17b is thus urged by its spring action into the respective detent portion defined by edge 24a or 25a, respectively, upon movement of the lever into the respective operation position.

Thus, if lever 13 is moved clockwise, as viewed in FIG. 2, against the bias of spring 17, arm 17b will be moved by projection 18 (FIG. 3) so as to engage detent 25a as shown in FIG. 2a. In this position, lever 13 is retained in its clockwise position. Lever 13 is similarly retained in its anticlockwise position by engagement of arm 17a with detent 24a.

Pivotally mounted in a slot 26 in the base 11 is a release member 27. Slot 26 extends along a line corresponding to the central position of lever 13. Release member 27 is biased away from boss 16 and towards a central angular position by extension springs 28. Member 27 has a pair of cam surfaces 29, 30 which intersect at an edge 31 and slope away from edge 31 in the direction of the base 11 (see FIGS. 2 and 4 particularly). Surfaces 29, 30 are positioned so that they can engage the respective spring arms 17a, 17b when the latter engage the respective detents 24a, 25a. Release member 27 is engaged by a wedge-shaped upstanding portion 32 on the projection 19 of lever 13. Portion 32 acts to urge release member 27 against the bias of springs 28, to the end of slot 26 remote from recess 25 when the lever 13 is in its central position (see FIG. 1).

The body 10 carries a pair of terminals (not shown) and the lever 13 carries a contact element (not shown) which connects the respective terminals to an electrical supply when the lever 13 is in its respective clockwise and anticlockwise positions. Such features of the switch do not form part of the present invention and will be described in no further detail.

In use, the mechanism is secured to a sleeve indicated at 33, surrounding the steering column of a road vehicle, shown generally at 34. An arm of member 27 projects through the sleeve 33 so as to be engageable with a striker 35 on the column 34. Striker 35 is positioned so that with the steering column 34 in its central angular position, striker 35 is aligned with slot 26 and the pivotal axis of lever 13. When the lever 13 is in its central position member 27 is, as described above, displaced by lever portion 32 so as to lie clear of projection 35.

If the lever 13 is moved to its clockwise position, to provide a right turn signal, spring arm 17b engages detent 25a and member 27 is permitted to move under the influence of springs 28 so as to abut the projection 35 on column 34. Subsequent rotation of column 34 in a clockwise direction allows member 27 to move to the full extent of slot 26 (as shown in FIG. 2a). Complete rotation of column 34 in a clockwise direction will cause projection 35 to move member 27 in an anticlockwise direction, thereby moving cam surface 30 away from spring arm 17b. The mechanism will not therefore, be cancelled by clockwise rotation of column 34. If column 34 is then rotated anticlockwise to its initial central position, projection 35 rotates member 27 clockwise, cam surface 30 lifts spring arm 17b from detent 25a and lever 13 is returned to its central position under the action of torsion spring 17. As lever 13 centralises, member 27 is urged by lever portion 32 clear of engagement by projection 35.

The mechanism operates in a similar manner to provide a cancelling indication for a left-hand turn.

Detent edges 24a, 25a, are not vertical with respect to the plane of the base 11 but are mutually divergent, the angles of edges 24a, 25a with respect to the base 11 being such as just to retain the respective spring arms 17a, 17b, but to cause these arms to ride up edges 24a, 25a, if lever 13 is manually returned to a central position.

I claim:

1. A switch actuating mechanism for a self-cancelling direction indicator switch comprising a body, a lever pivotally mounted on said body and movable from a central position to a pair of operative positions disposed respectively on opposite sides of the central position, a pair of spring arms mounted on said body and engaged with said lever, said spring arms being arranged to be deflected upon movement of said lever from its central position towards its respective operative position so as to bias said lever toward its central position, each of said spring arms also being capable of deflection in a transverse direction to a direction in which it is deflected by said lever, a pair of detent portions on said body into respective engagement with which detent portions said respective spring arms can move in said transverse direction when said lever is moved to its respective operating positions, a release member mounted on said body for pivotal movement and also for displacement towards and away from a striker-engaging position, a cam surface on said release member, said cam surface being engageable with either one of said spring arms, when the respective spring arm is engaged with its respective detent portion, for transversely moving that spring arm to release it from engagement with its said respective detent portion when said release member is pivotally moved by an associated striker, spring means acting on said release member to urge it to said striker-engaging position, and an abutment on said lever for causing displacement of said release member out of its striker-engaging position when said lever is in its central position.

2. A switch actuating mechanism as claimed in claim 1, wherein said release member has a pivot portion which is slidable in a recess formed in said body for displacement towards and away from said striker-engaging position, said recess extending along a line corresponding to the central position of said lever.

3. A switch actuating mechanism as claimed in claim 1, wherein said detent portions are defined by edges of ramps extending from said body and along which said respective spring arms are slidable, said ramps increasing in height towards said respective edges.

* * * * *